(12) United States Patent
Blanco et al.

(10) Patent No.: US 7,764,247 B2
(45) Date of Patent: Jul. 27, 2010

(54) ADAPTIVE HEADS-UP USER INTERFACE FOR AUTOMOBILES

(75) Inventors: Victor K. Blanco, Redmond, WA (US); Flora P. Goldthwaite, Seattle, WA (US); David W. Baumert, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 11/357,505

(22) Filed: Feb. 17, 2006

(65) Prior Publication Data

US 2007/0194902 A1 Aug. 23, 2007

(51) Int. Cl.
G09G 5/00 (2006.01)
(52) U.S. Cl. .......................................... 345/7; 709/231
(58) Field of Classification Search ...................... 345/7, 345/810; 709/231; 340/984
See application file for complete search history.

(56) References Cited

U.S. PATENT DOCUMENTS

| | | | | |
|---|---|---|---|---|
| 5,367,297 A | * | 11/1994 | Yokoyama | .................. 340/984 |
| 5,689,619 A | | 11/1997 | Smyth | |
| 5,784,036 A | * | 7/1998 | Higuchi et al. | .................. 345/7 |
| 5,949,345 A | | 9/1999 | Beckert et al. | |
| 6,009,355 A | * | 12/1999 | Obradovich et al. | ............ 701/1 |
| 6,201,540 B1 | | 3/2001 | Gallup et al. | |
| 6,603,491 B2 | | 8/2003 | Lemelson et al. | |
| 6,654,070 B1 | * | 11/2003 | Rofe | ............................ 349/11 |
| 6,847,336 B1 | | 1/2005 | Lemelson et al. | |
| 7,053,866 B1 | | 5/2006 | Mimran | |
| 7,126,583 B1 | * | 10/2006 | Breed | .......................... 345/158 |
| 2001/0056325 A1 | | 12/2001 | Pu et al. | |
| 2002/0085043 A1 | * | 7/2002 | Ribak | .......................... 345/810 |
| 2003/0025693 A1 | | 2/2003 | Haley | |
| 2003/0065805 A1 | * | 4/2003 | Barnes, Jr. | ................... 709/231 |
| 2004/0204836 A1 | | 10/2004 | Riney | |
| 2005/0154798 A1 | | 7/2005 | Nurmi | |
| 2005/0193370 A1 | | 9/2005 | Goring et al. | |
| 2006/0132924 A1 | * | 6/2006 | Mimran | ....................... 359/630 |

OTHER PUBLICATIONS

Kazuyo Iwamoto and Kazuo Tanie, High Resolution, Wide View Angle Head Mounted Display Using Eye Movement Tracking: System Structure and Evaluation Experiments, IEEE International Workshop on Robot and Human Communication, 1995, pp. 289-294, IEEE.

(Continued)

*Primary Examiner*—Amare Mengistu
*Assistant Examiner*—Premal Patel
(74) *Attorney, Agent, or Firm*—Shook, Hardy & Bacon LLP

(57) ABSTRACT

An adaptive user interface presented on a heads-up display of an automobile is provided. The adaptive user interface comprises a number of display elements that may be presented in a variety of display states. The display state for each display element is determined based on inputs from a variety of sources (e.g., the automobile).

15 Claims, 15 Drawing Sheets

OTHER PUBLICATIONS

Rainer Wasinger and Antonio Kruger, Multi-modal Interaction with Mobile Navigation Systems, 2006, abstract at http://www.extenza-eps.com/OLD/doi/abs/10.1524/itit.46.6.322.54678.

Joseph J. Laviola Jr. et al., Hands Free Multi-Scale Navigation in Virtual Environments, 2001, pp. 9-15, ACM, Research Triangle Park, North Carolina, U.S.A.

Tobias Hollerer, et al., User Interface Management Techniques for Collaborative Mobile Augmented Reality, Computers and Graphics 25(5), Oct. 2001, pp. 799-810.

N. Cairnie, et al., A Gesture-Driven Adaptive Interface for Safer Driving, pp. 3.4.1-3.4.12, European Conference of Vehicle Electornic Systems, ERA, Jun. 2000.

* cited by examiner

ADAPTIVE HEADS-UP USER INTERFACE FOR AUTOMOBILES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

An increasing number and variety of mobile solutions have become available to meet the needs of users in our fast-paced and mobile society. Mobile devices, such as cell phones and personal data assistants (PDAs), which may be generally considered as portable computing devices, have become increasingly popular and valuable to users. One location in which users often wish to access these mobile solutions is within their automobiles while they are driving. However, none of these devices have reached a level of integration with automobiles to provide users with a safe, yet productive driving experience. This is becoming more evident, for example, as states are choosing to ban the use of cell phones while driving.

Another safety issue associated with automobiles is the time and attention required for drivers to interact with interfaces provided within automobiles. Automobiles are typically equipped with a number of interfaces, such as instrument panels (e.g., providing car status information such as speed, fuel level, etc.), stereo systems, climate control systems, and global positional system (GPS) navigation systems. Tasks, such as reading information from an instrument panel or navigating controls on a stereo system, require drivers to take their eyes off the road and refocus their eyes on the interface at a short distance from them. Then, after the task is complete, drivers must refocus their vision back to the road to deal with the change in their driving state since they looked away.

Currently, a number of automobile manufacturers provide heads-up displays (HUDs), which generally consist of projecting information on the windshield of an automobile, allowing a driver to view the projected information without having to look down at an instrument panel. However, such HUDs only provide limited automobile-associated information, such as current speed and navigation information. Additionally, such information is presented on the HUD in a static state, in which a driver may not interact with the information. As indicated previously, the vast array of mobile solutions and associated information have not been adequately integrated with automobiles. Moreover, if more extensive information were provided via HUDs within automobiles, the additional information poses a possible problem of obscuring the driver's view, potentially offsetting any safety and other benefits.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

An adaptive user interface presented on a HUD within an automobile is described herein. The adaptive user interface is dynamically exposed and organized based on various metrics (e.g., inputs from the automobile, a user, mobile devices, and remote sources). The adaptive user interface allows users to access information in context without obscuring the driver's view. The adaptive user interface may be comprised of a number of display elements, each of which may be displayed in a variety of display states. Inputs from various sources provide a context for the adaptive user interface, and the current display state for each display element may be determined based on the inputs.

BRIEF DESCRIPTION OF THE SEVERAL VIEWS OF THE DRAWING

The present invention is described in detail below with reference to the attached drawing figures, wherein.

DETAILED DESCRIPTION

Figure 1:
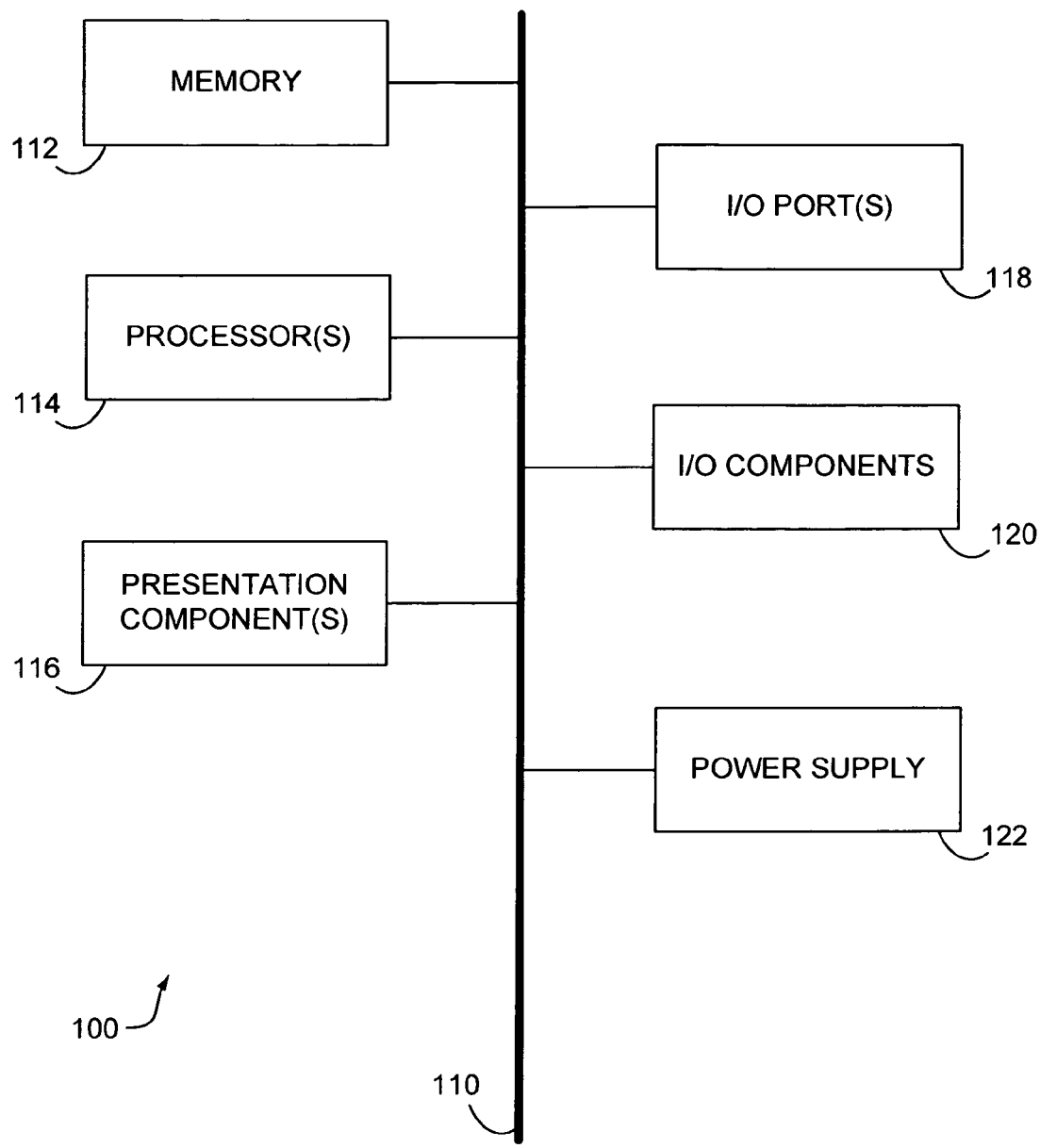
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide an adaptive user interface presented on a HUD of an automobile that can be navigated using a variety of control means, such as head or eye movements, voice recognition, and control buttons (e.g., on a steering wheel). The user interface allows a driver to access a wide variety of information, while the location of the information on the HUD keeps the driver's attention focused in the direction of the road, reducing the amount of time his/her attention is elsewhere. At the same time, the adaptive nature of user interface elements takes cues from various metrics (e.g., automobile status information, user input, docked devices, externally networked sources, etc.) to provide the driver with information in context while not obscuring the driver's view. Metrics or inputs from the automobile, such as speed, turn signals, and automobile direction may be used to provide the safest, most convenient, and most productive view of information that is relevant to the driver at that time. Additionally, user input metrics based on user interaction and biometric information, for example, provide further cues into the user interface layout schema, thereby helping to determine elements of the user interface in which the user is currently interested. Inputs associated with docked devices and externally networked sources may further be used to filter available information for presentation via the user interface.

Accordingly, in one aspect, an embodiment of the present invention is directed to one or more computer-readable media having computer-useable instructions embodied thereon for presenting one or more adaptive user interfaces on a HUD of an automobile. The one or more adaptive user interfaces include a number of display elements. Each of the display elements is configured to be displayed in a number of display states. Each of the display elements is displayed in one of the display states based at least in part on one or more inputs associated with the automobile.

In another aspect of the invention, an embodiment is directed to a method for presenting an adaptive user interface on a HUD of an automobile, the adaptive user interface comprising a number of display elements, each of the display elements being configured to be presented in a number of display states. The method includes receiving one or more inputs from one or more sources providing a context for the adaptive user interface, wherein the one or more inputs include one or inputs from the automobile. The method also includes determining a display state for each of the display elements based on the one or more inputs. The method further includes configuring the adaptive user interface and presenting the adaptive user interface on the HUD of the automobile.

In yet anther aspect, an embodiment of the present invention is directed to one or more computer-readable media having computer-useable instructions embodied thereon for presenting one or more user interfaces on a heads-up display of an automobile. The one or more user interfaces include one or more user-selectable display elements, wherein at least one of the user-selectable display elements comprises information other than navigational information and information associated with the automobile.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in conjunction with a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, HUD, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, smart device, steering wheel controls, etc.

Figure 2:
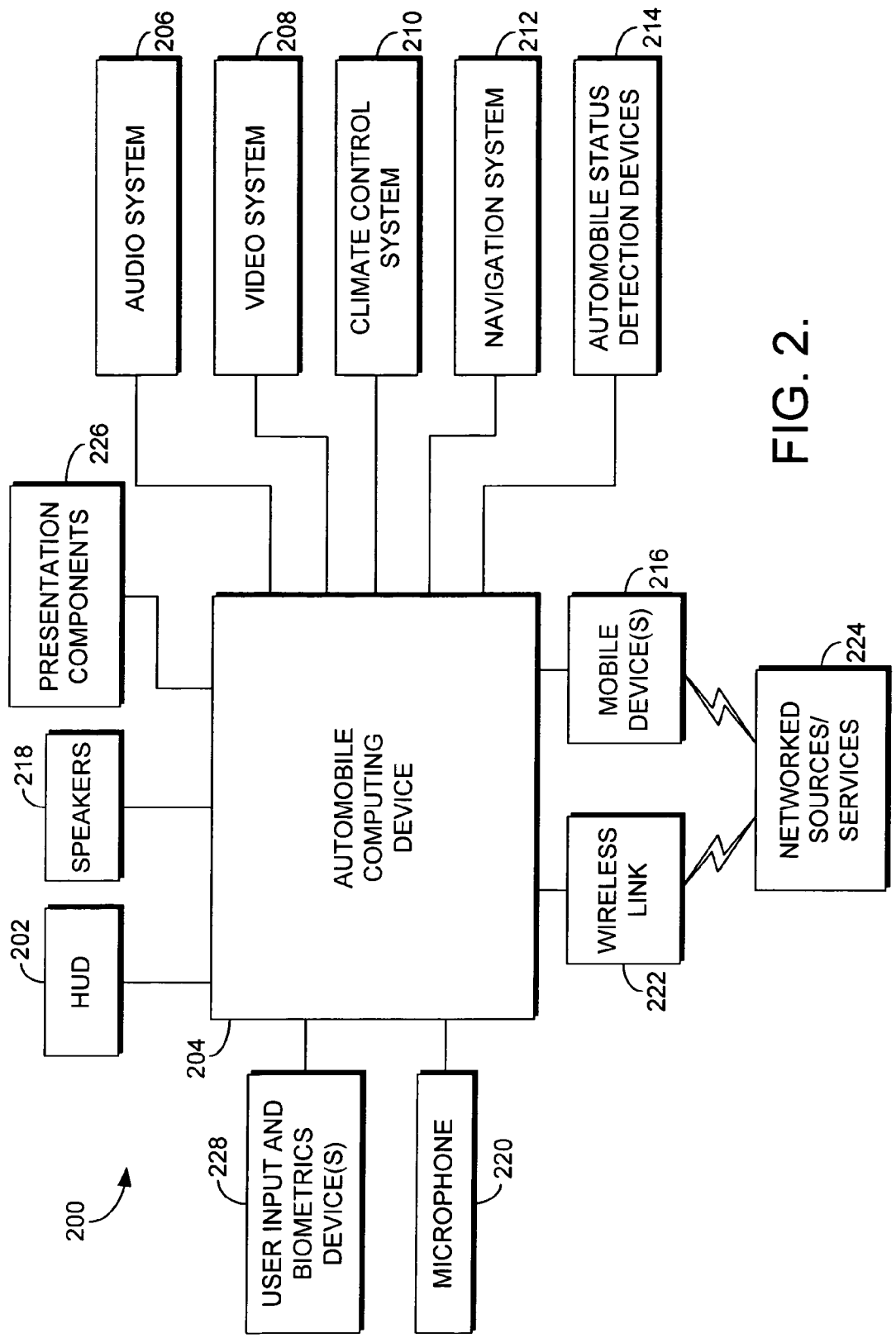
FIG. 2 is a block diagram of an exemplary automobile computing system in which embodiments of the present invention may be implemented.

Referring now to FIG. 2, a block diagram is illustrated showing an exemplary automobile computing system 200 in which embodiments of the present invention may be implemented. The automobile computing system 200 provides an adaptive user interface that may be displayed on a HUD 202 of an automobile. The adaptive user interface may be generated by aggregating information from a number of different sources and filtering the information based on various metrics. As such, the automobile computing system 200 may provide context-appropriate information to a driver in a non-intrusive manner. The driver may interact with the adaptive user interface to access various aspects of the aggregated information, as well as to control interfaced components.

The automobile computing system 200 includes an automobile computing device 204, which is generally operative to control the system 200. The automobile computing device 204 interfaces with and/or controls various other components of the system 200. It should be noted that the components interfacing with the automobile computing device 204 shown in FIG. 2 are provided by way of illustration only and are not intended to limit the scope of the present invention. For example, in various embodiments of the present invention, some components shown within system 200 may be combined with other components or omitted altogether. In some embodiments, components may be integrated with the automobile computing device 204. Further, in some embodiments, components not shown in FIG. 2 may interface with the automobile computing device 204.

As shown in FIG. 2, a number of components often associated with automobiles, such as an audio system 206 (e.g., a stereo system), a video system 208 (e.g., a DVD player), a climate control system 210, and a navigation system 212, may be interfaced with the automobile computing device 204. Although each of these components typically include its own integrated user interface (e.g., located within the automobile's dashboard), by interfacing these components with the automobile computing device 204, the adaptive user interface presented on the HUD 202 may be used to display information associated with each component and further may be used to control each component. For example, by interfacing the automobile's audio system 206, the driver may be able to view information, such as a current radio station or CD, and also control the audio system (e.g., change the current radio station, skip songs on a CD that is playing, etc.).

The automobile computer device 204 may also be interfaced, directly or indirectly, with the numerous automobile status detection devices 214 typically provided in automobiles. These devices 214 provide automobile status information that is usually presented to a driver via the automobile's instrument panel. For example, such automobile status information may include the automobile's speed, fuel level, oil temperature, mileage, and miles per gallon information. The automobile status detection devices 214 may also allow for a number of user inputs to be provided to the automobile computer device 204. For example, user inputs may be provided via devices associated with steering, brakes, gas, and turn signals.

One or more mobile devices 216, such as cell phones, PDAs, and media devices, may also be interfaced with the automobile computer device 204. For example, a user may dock or otherwise connect (wired or wireless) one or more mobile devices 216 with the automobile computing device 204. By interfacing a mobile device 216 with the automobile computing device 204, a number of benefits may be realized. For example, by connecting a media device, media content stored on the device may be access by the automobile computing system 200. As another example, by connecting a PDA or a cell phone, information, such as contact lists or documents stored on the device, may be accessed and presented via the adaptive user interface.

In some embodiments, the automobile computing system 200 may be able to take advantage of the wireless communication capability of a connected cell phone or other wireless device. For example, the system 200 may be able to use a connected cell phone to allow a driver to place and receive phone calls. Additionally, the system 200 may provide for hands free communication via an automobile's speakers 218 and a microphone 220 installed within the automobile. In some embodiments, wireless communication capability for the system 200 may be provided via a wireless link 222, such as an RF device, integrated within the automobile.

In addition to providing hands free communication for phone calls, the wireless link 222 and/or a connected mobile device 216 may also provide access to remote networked sources and services 224. It should be noted that any type of network source and service 224 is contemplated within the scope of the present invention. By way of example only and not limitation, networked sources and services 224 may include location-based services. For instance, advertisements for nearby businesses or information for nearby historical sites may be provided based on the automobile's location (e.g., a location provided via the GPS capability of the navigation system 212). Additionally, driving safety information may be provided, such as accidents or construction ahead of the automobile. As another example, the system 200 may be able to access the network of the driver's employer, allowing the system 200 to access information, such as work documents, to-do lists, emails, and calendars.

As indicated previously, an adaptive user interface that allows users to access aggregated information and control interfaced components may be presented on a HUD 202 displayed within the automobile. Additionally, a text-to-speech capability may be provided within the automobile computing system 200 to allow audible presentation of information, for instance, via the automobile's speakers 210. The automobile computing system 200 may further include a number of other presentation components 226, such as auxiliary displays for passengers.

The automobile computing system 200 may further include one or more user input and biometric devices 228 to navigate the adaptive user interface and otherwise provide various user interaction inputs. For example, head and/or eye tracking devices may be provided allowing a driver to navigate the adaptive user interface with head and/or eye movements. Such tracking devices allow the driver to navigate the adaptive user interface by simply glancing at interface elements on the HUD 202, thereby keeping the driver's attention directed towards the road. Additionally, controls may be provided on the automobile's steering wheel. For instance, a series of buttons, such as up, down, left, right, and select buttons, may be provided on the steering wheel, allowing a driver to easily navigate the adaptive user interface while keeping both hands on the steering wheel at all times. A microphone 220 installed within the automobile in conjunction with speech recognition capability may also allow the user to provide verbal commands for navigating the adaptive user interface.

The user input and biometric devices 228 may further provide various biometric information, such as body temperature, heart rate, and pressure on a steering wheel. Such information may be useful to determine potentially dangerous conditions, such as a tired driver falling asleep or a driver experiencing road rage.

Turning now to FIG. 3A through FIG. 3L, illustrations are provided of exemplary adaptive user interfaces presented on a HUD of an automobile in accordance with embodiments of the present invention. It will be understood and appreciated by those of ordinary skill in the art that the user interfaces illustrated in FIG. 3A through FIG. 3L are shown by way of example only and are not intended to limit the scope of the invention in any way.

Figure 3A:
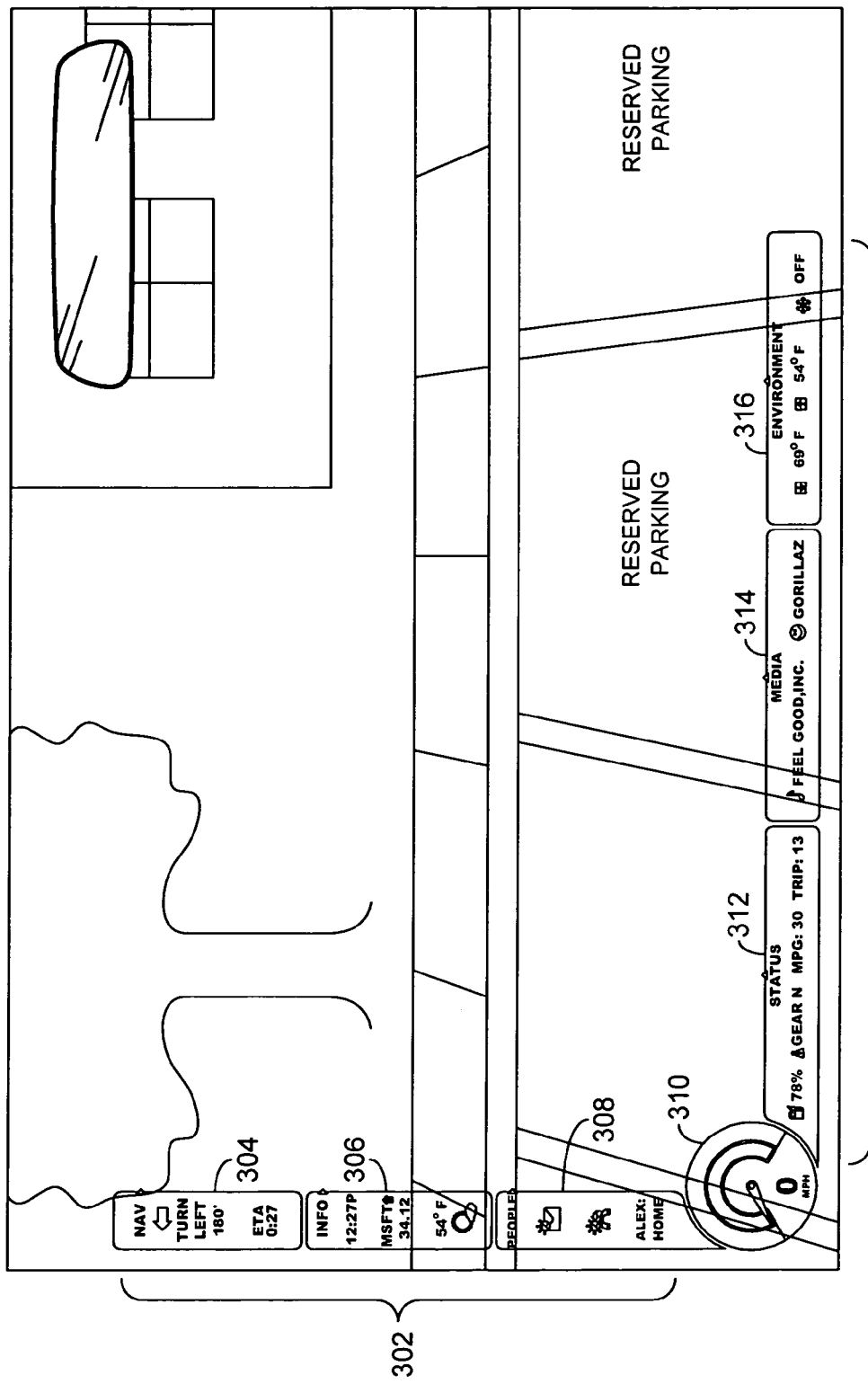
FIGS. 3A through 3L are illustrations of exemplary adaptive user interfaces presented on the HUD of an automobile in accordance with embodiments of the present invention.
Figure 3B:
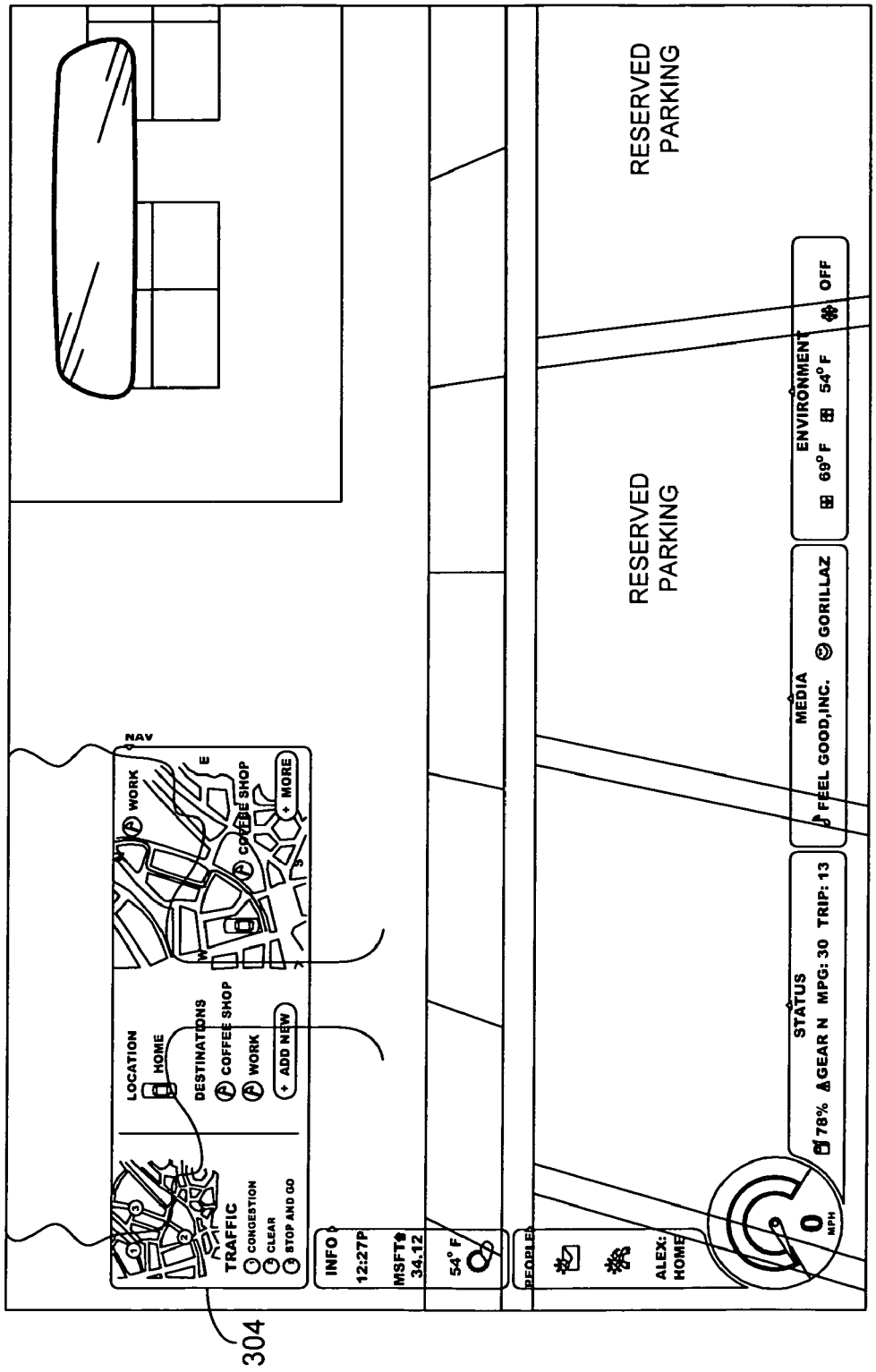
Figure 3C:
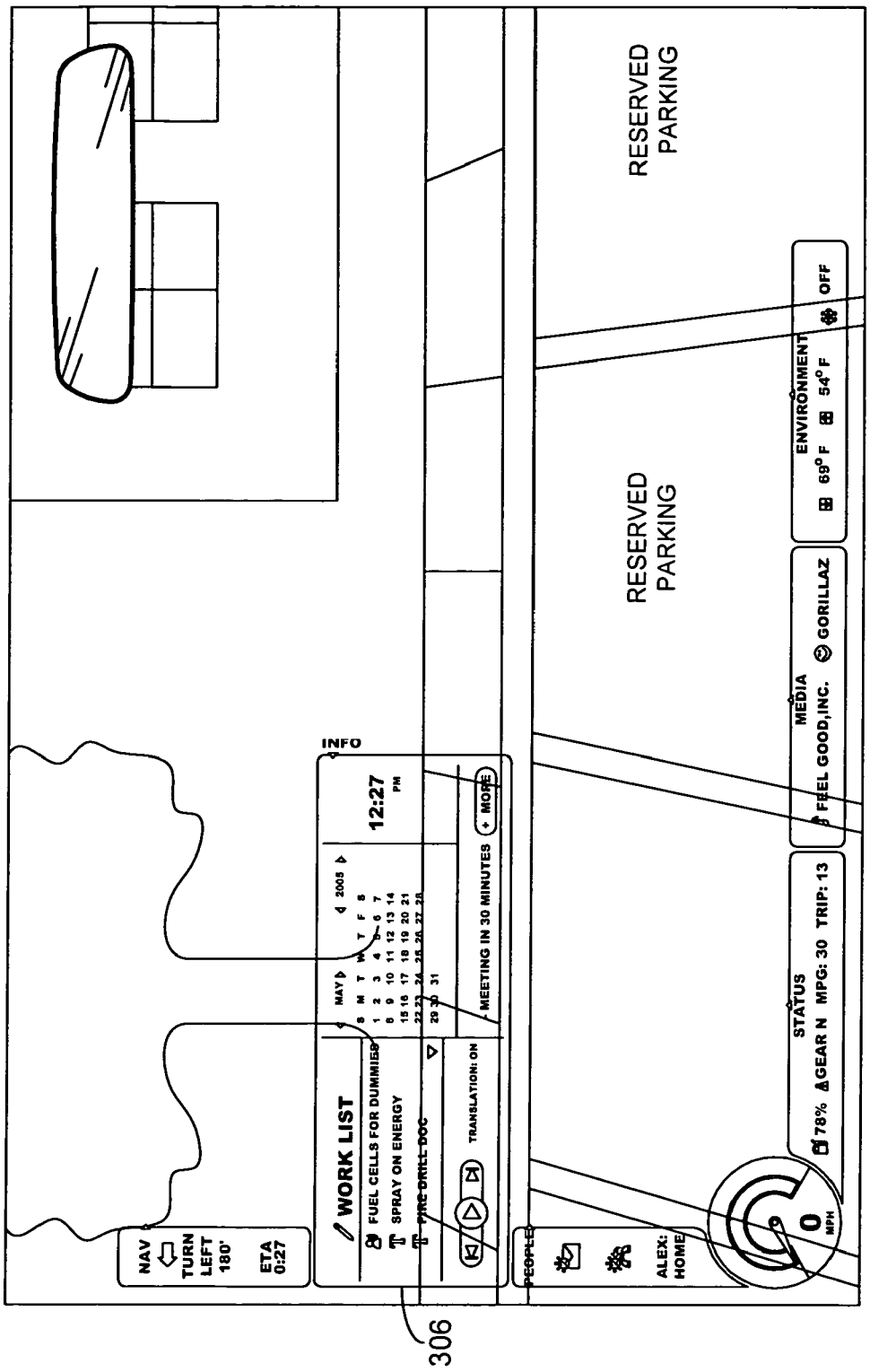
Figure 3D:
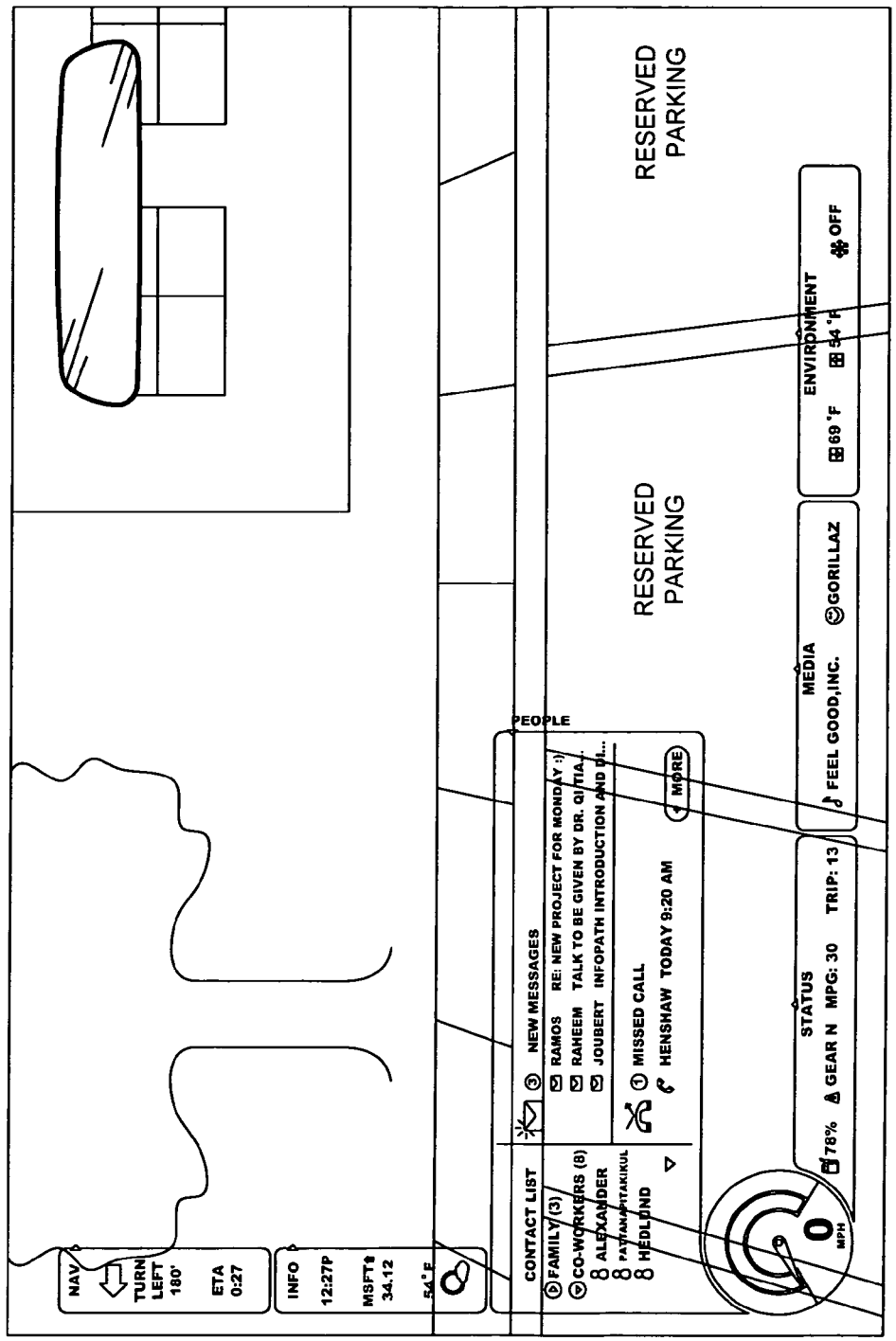

Referring initially to FIG. 3A, an illustration is provided of an adaptive user interface presented on a HUD of an automobile while the automobile is parked. The user interface includes a number of display elements 302, which are generally anchored along the left side and the bottom few inches of the windshield. As indicated previously, the adaptive user interface is dynamically exposed and organized based on metrics from various sources, including the automobile, user inputs, docked devices, and networked sources and services. Each display element 302 is configured to be presented in a number of display states that are dependent upon these metrics. Additionally, information available for presentation via the adaptive user interface may be filtered based on these metrics. Rules may be defined within the system that dictate the current display state for each display element and which information to filter based on incoming metrics. These rules may be based on a variety of factors within the scope of the present invention, and in some embodiments, the rules may be based on user preferences (i.e., user-defined rules) and/or safety requirements. Accordingly, each display state provides varying levels of information appropriate for the driver's situation. As such, information may be presented via the adaptive user interface in context while not obscuring the driver's view or otherwise creating untimely distractions.

In one embodiment, the display states of the display elements 302 include a hidden state, a collapsed state, a preview state, and a full view state. In the hidden state, a display element is either completely removed or dimmed within the adaptive user interface. Typically, non-crucial display elements are displayed in the hidden state while an automobile is being driven to minimize any distraction caused by the non-crucial display elements. A display element may also be displayed in the hidden state in situations in which the display element is dependent upon information from a source that is not currently available. For example, in the case that information for a display element is accessed from a mobile device, the display element may be hidden if the mobile device has not been connected to the system.

In the collapsed state, a display element is condensed to its smallest form and provides only a very limited amount of information. For example, the display elements 302 shown in FIG. 3 are currently being presented in the collapsed state. The collapsed state allows a user to quickly access high level information associated with each display element, while reducing the amount of space obscured by the display elements.

In the full view state, the user is provided a rich experience by leveraging the real estate of the windshield to present more detailed information associated with a selected display element. Because the full view state may obscure the driver's view, the full view state may be limited to situations in which a user selects a display element while the automobile is parked or otherwise stopped.

While an automobile is being driven, a display element may be activated to provide relevant information in a preview state. The amount of information provided while in the preview state is typically more extensive than that provided in the collapsed state, while typically less extensive than that provided in the full view state. A display element may be activated while the automobile is being driven based on inputs from a number of different sources within the scope of the present invention. For example, a display element may be manually selected by a user while driving, causing the display element to be presented in the preview state. Additionally, information provided via networked services and sources may be deemed appropriate to activate a display element in the preview state to provide the driver with relevant information. For example, information regarding an accident ahead may be received and provided via a display element in the preview state.

In some embodiments, the adaptive user interface may be user-configurable, allowing users to define personal preferences. For example, a user's personal preferences may dictate the display elements that are presented within the user interface, the location at which the display elements are presented, and the inputs that dictate the display state for each element. In some cases, preferences for multiple drivers of an automobile may be stored and accessed to present the appropriate adaptive user interface for the current driver. For example, family members who drive a common automobile may each define their personal preferences for the adaptive user interface. When a particular family member enters the automobile, an indication may be provided to the system regarding an identification of the current driver. In response, the system may retrieve the personal preferences for that driver and present the adaptive user interface in accordance with those preferences.

Referring again to FIG. 3A, the display elements 302 presented in the exemplary adaptive user interface include a navigation element 304, an information element 306, a people element 308, a speedometer element 310, a status element 312, a media element 314, and an environment element 316. It should be noted that these display elements 302 are provided for illustrative purposes only and other types of display elements may be included within the adaptive user interface in accordance with varying embodiments of the present invention. Additionally, as mentioned previously, each of the display elements 302 shown in FIG. 3 is presented in the collapsed state, providing limited information associated with each display element.

The navigation element 304 provides navigational information, such as information that may be provided via a GPS-based navigation system. In the collapsed state shown in FIG. 3A, general directional information may be provided. In a full view state, such as that shown in the exemplary adaptive user interface illustrated in FIG. 3B, more detailed information, such as maps, points of interest, and point-to-point navigation, may be provided via the navigation element 304.

The information element 306 presents information that may be accessed from a variety of local and networked sources. For example, in the collapsed state shown in FIG. 3A, the information element 306 may provide current time and temperature. In the full view state, such as that shown in FIG. 3C, the information element 306 may provide more detailed information from local and remote, networked sources. For example, personal content, including a work list and calendar, are presented in the information element in FIG. 3C. A wide variety of other information may also be presented via the information element 306, such as, for example, location-based information, geography information, local advertisements, and historical information.

The people element 308 provides contact information within the user interface. Additionally, the people element 308 may be employed by a user to select and call contacts, as well as send and receive emails, via a docked wireless device or integrated wireless link. In the collapsed state shown in FIG. 3A, the people element 308 provides high level contact information, such as an indication of new email messages, missed calls, incoming calls, and the like. In the full view state, such as that shown in FIG. 3D, more robust contact information may be presented regarding information such as new email messages, missed calls, and available contacts, for example.

Figure 3E:
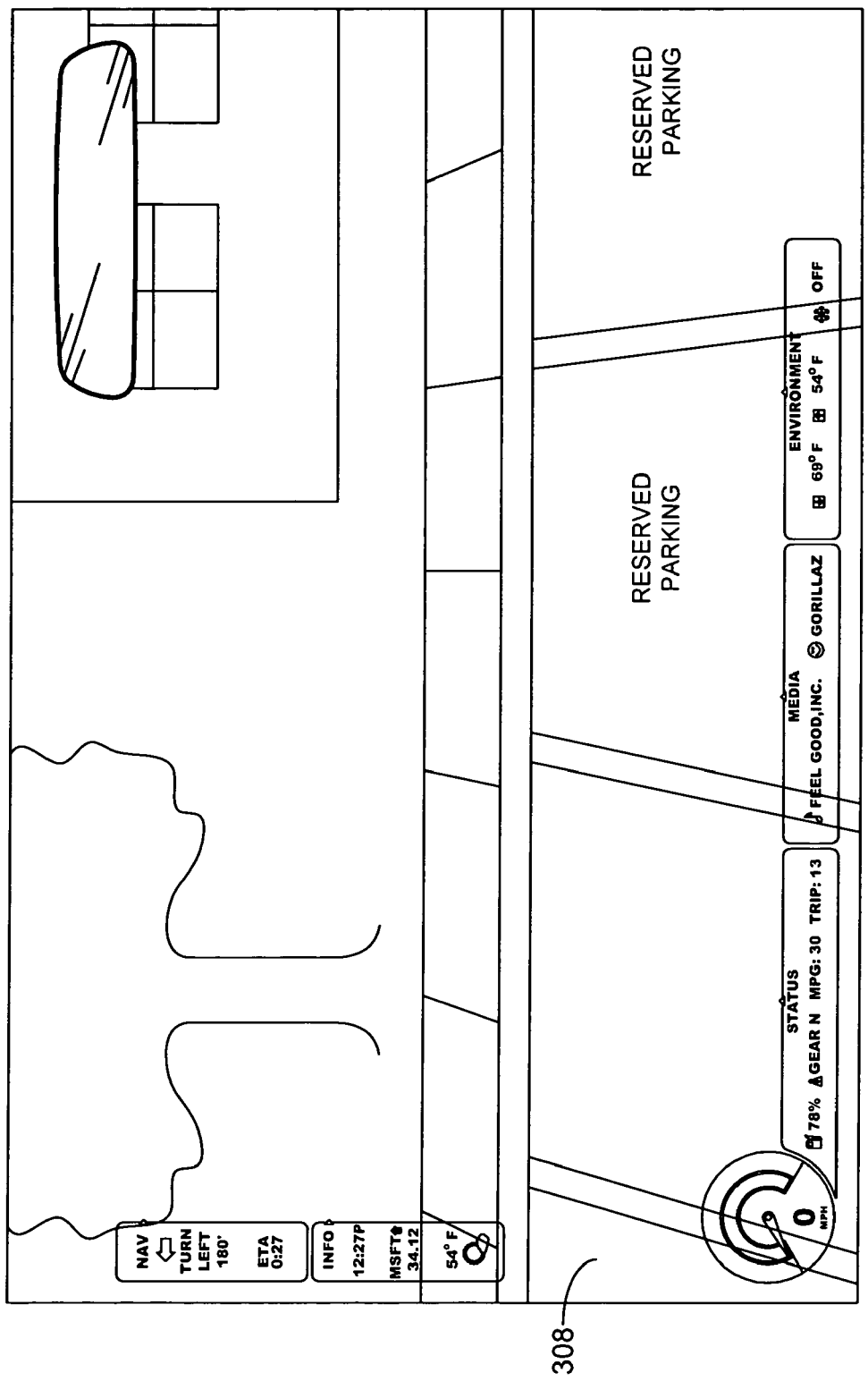
Figure 3F:
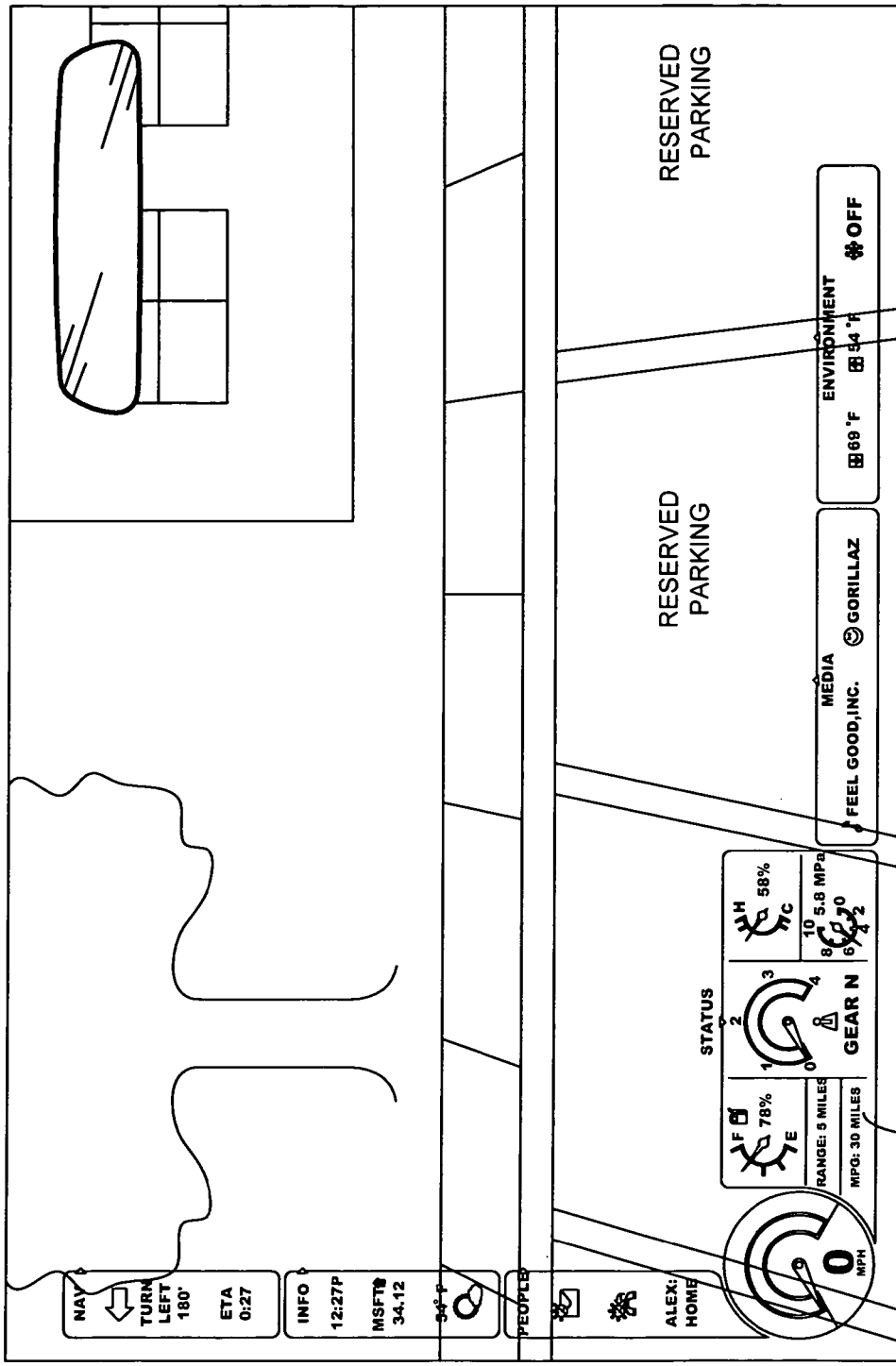
Figure 3G:
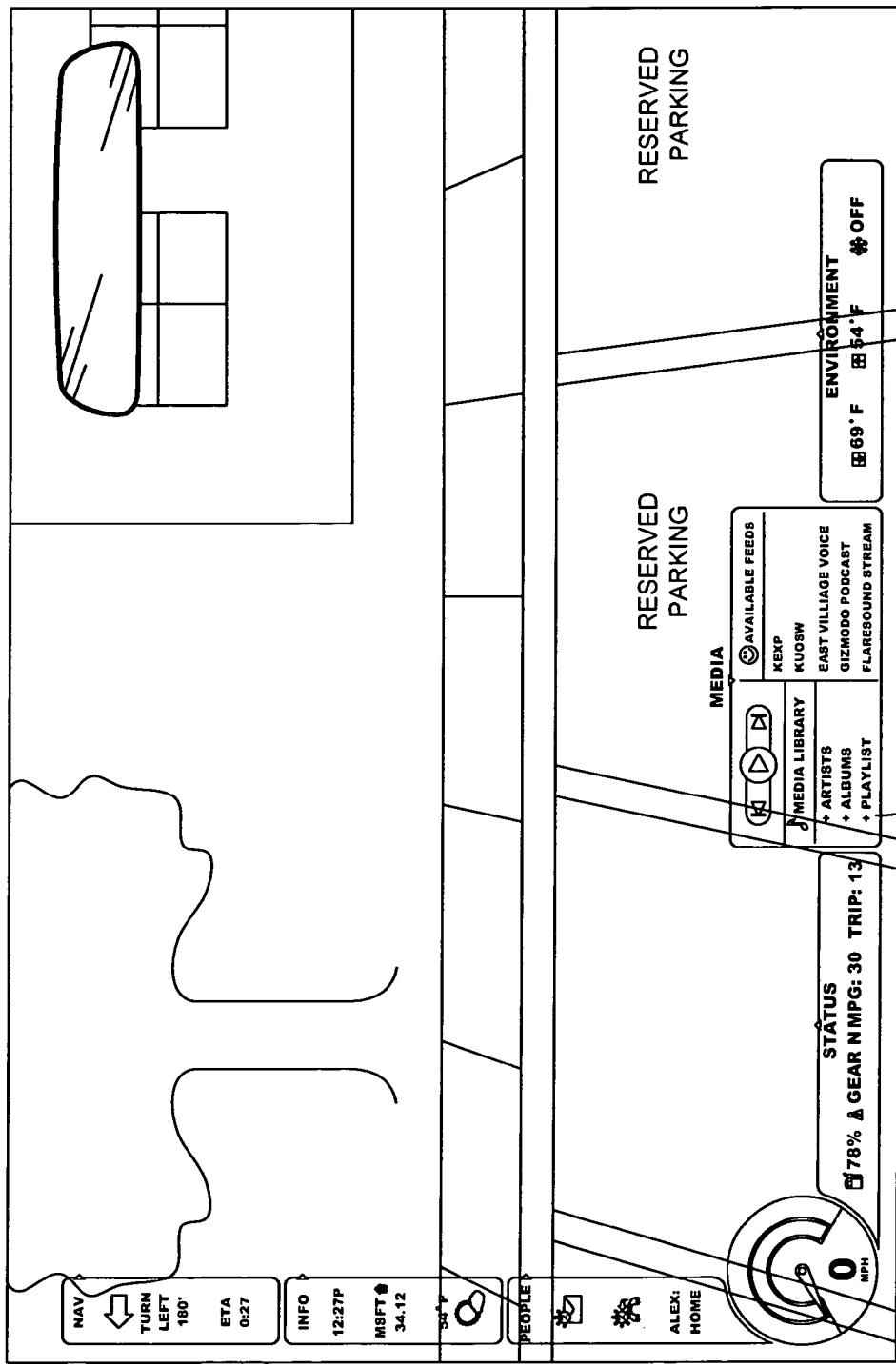
Figure 3H:
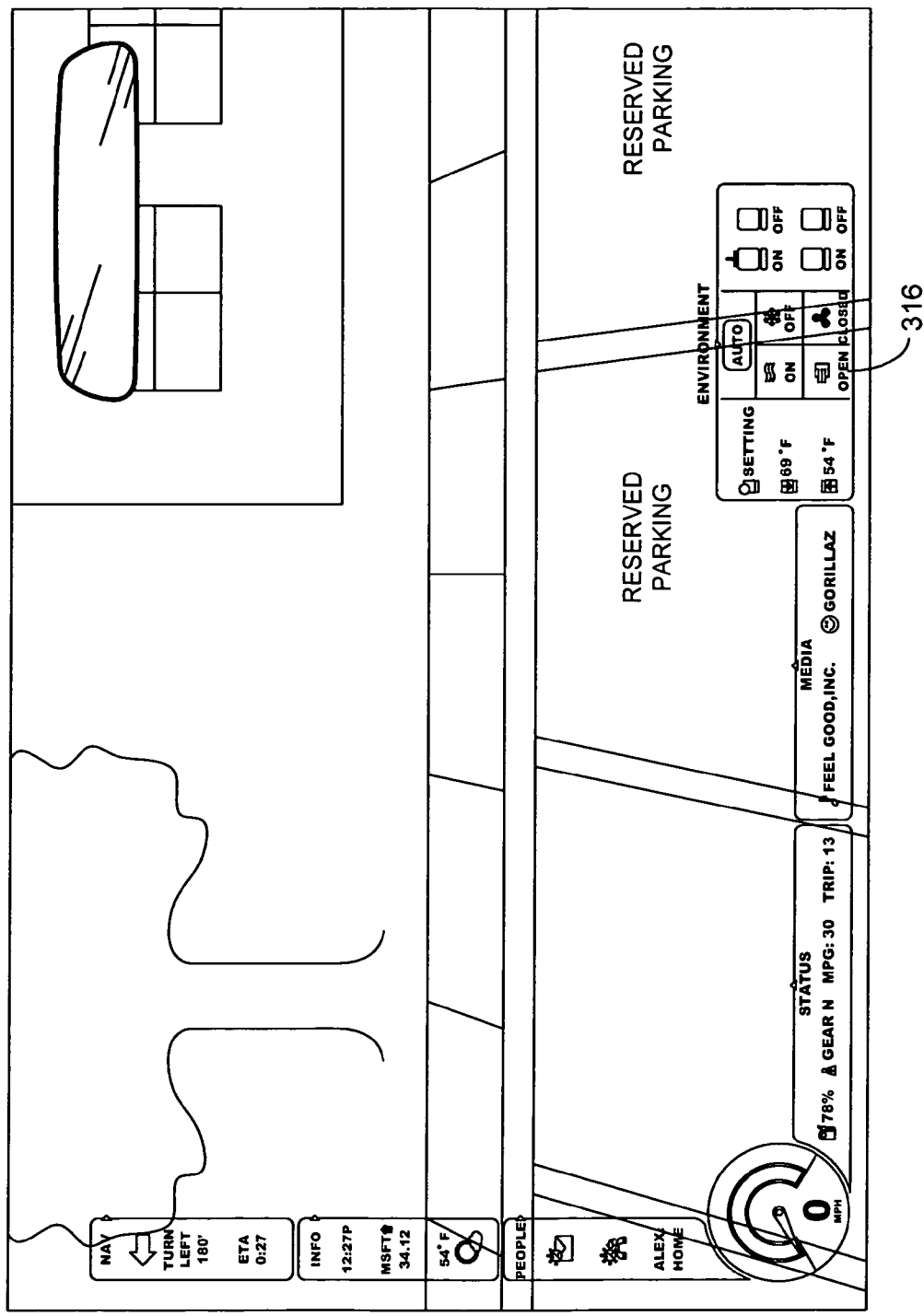

The contact information available via the people element 308 may be accessed from a number of different sources. In some embodiments, contact information may be stored locally, for example, within storage associated with the automobile computing device 204 of FIG. 2. In other embodiments, contact information may be accessed from an external, networked source. In further embodiments, contact information may be accessed from a mobile device, such as a cell phone, interfaced with the system. As shown in FIG. 3E, in the case in which contact information is accessed from an interfaced device, the people element 308 may be hidden if a device has not been interfaced with the system.

The speedometer element 310 displays the automobile's current speed and tachometer on the HUD. As such, a driver may quickly gleam this information from the HUD without removing his/her focus from the road to view the information from the instrument panel.

The status element 312 is designed as the central information hub for automobile status information. In the collapsed state shown in FIG. 3A, the status element 312 may present important items, such as fuel level and oil temperature. In the full view state, such as that shown in FIG. 3F, the status element 312 provides a detailed status of various components of the automobile.

The media element 314 acts as a portal for media content accessible by the system, such as media content stored locally, media contented stored on a connected media device, or media content from external feeds, for example. In the collapsed state shown in FIG. 3A, the media element 314 may provide current media content information, such as a currently playing song. In the full view state, such as that shown in FIG. 3G, the user may access and control his/her media library and available feeds.

The environment element 316 provides the user with status information and control associated with systems related to climate control within the automobile. For example, in the collapsed state shown in FIG. 3A, current climate control settings are presented. When selected and presented in the full view state, such as that shown in FIG. 3H, the environment element 316 allows the user to adjust the climate control system.

Figure 3I:
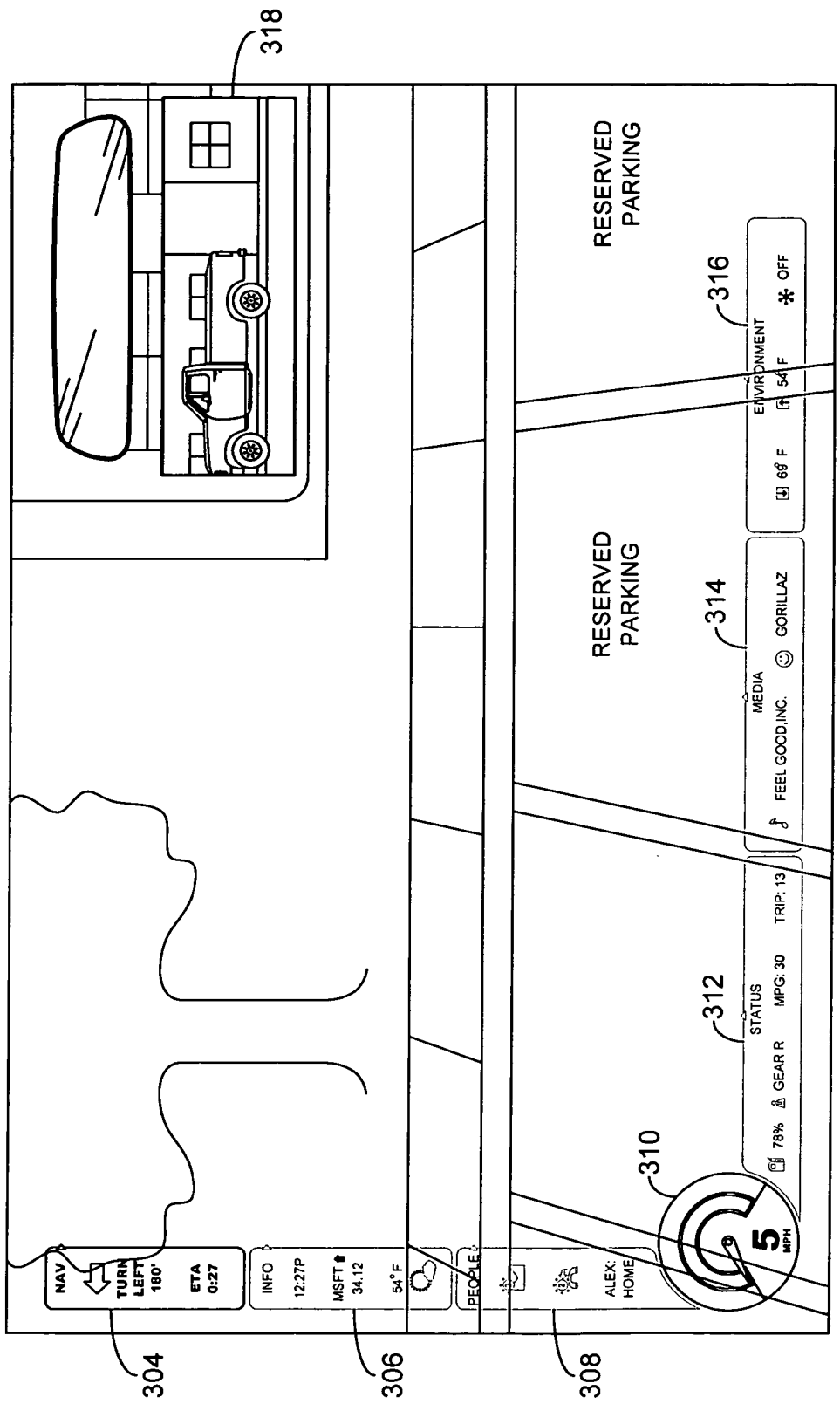

As discussed previously, the display elements 302 of the adaptive user interface are configured to be presented in a display state determined based on inputs received from various sources, such that the adaptive user interface is presented in a configuration appropriate for the automobile's current context. For example, referring to FIG. 3I, an illustration is provided of an adaptive user interface presented as the automobile is reversed. As shown in FIG. 3I, while the navigation element 304 and the speedometer element 310 are maintained in the collapsed state, each of the other display elements 306, 308, 312, 314, and 316 are displayed within the user interface in the hidden state. In particular, the elements 306, 308, 312, 314, and 316 have been dimmed to avoid visual clutter. In addition, the adaptive user interface displays a rear view 318 on the HUD that includes a live camera view from the rear of the automobile (e.g., from a camera mounted in the bumper or tailgate of the automobile).

Figure 3J:
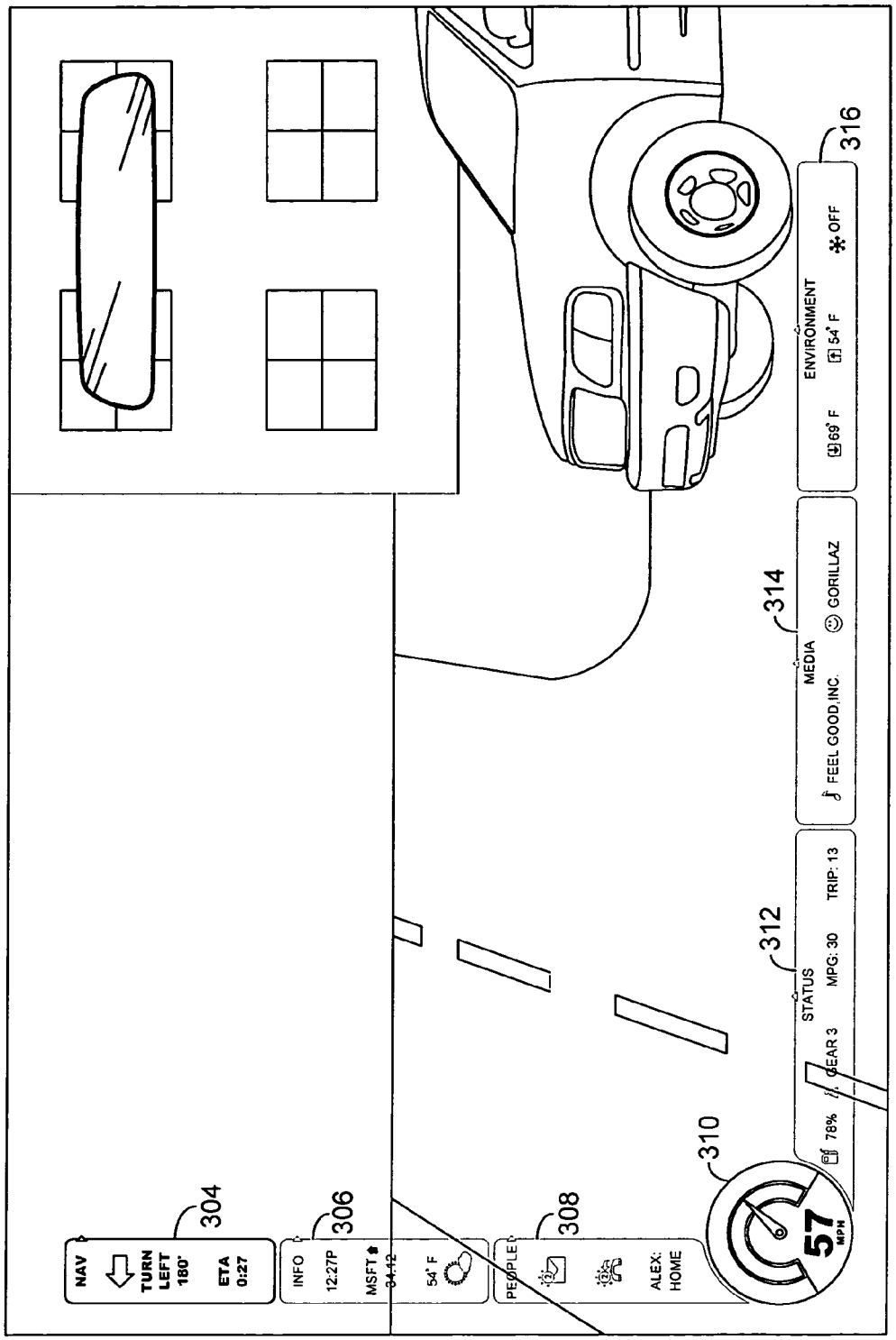

As the user begins to drive the automobile, the adaptive user interface similarly presents display elements in display states based on the current context of the automobile. FIG. 3J provides an illustration of the adaptive user interface while the automobile is being driven. As shown in FIG. 3J, display elements that may be considered as non-crucial in the driving context (e.g., display elements 306, 308, 312, 314, and 316) are displayed in the hidden state (e.g., dimmed) to avoid visual clutter while the user is driving. Display elements that are more relevant in the driving context, such as the navigational element 304 and the speedometer element 310, are presented in the collapsed state.

Figure 3K:
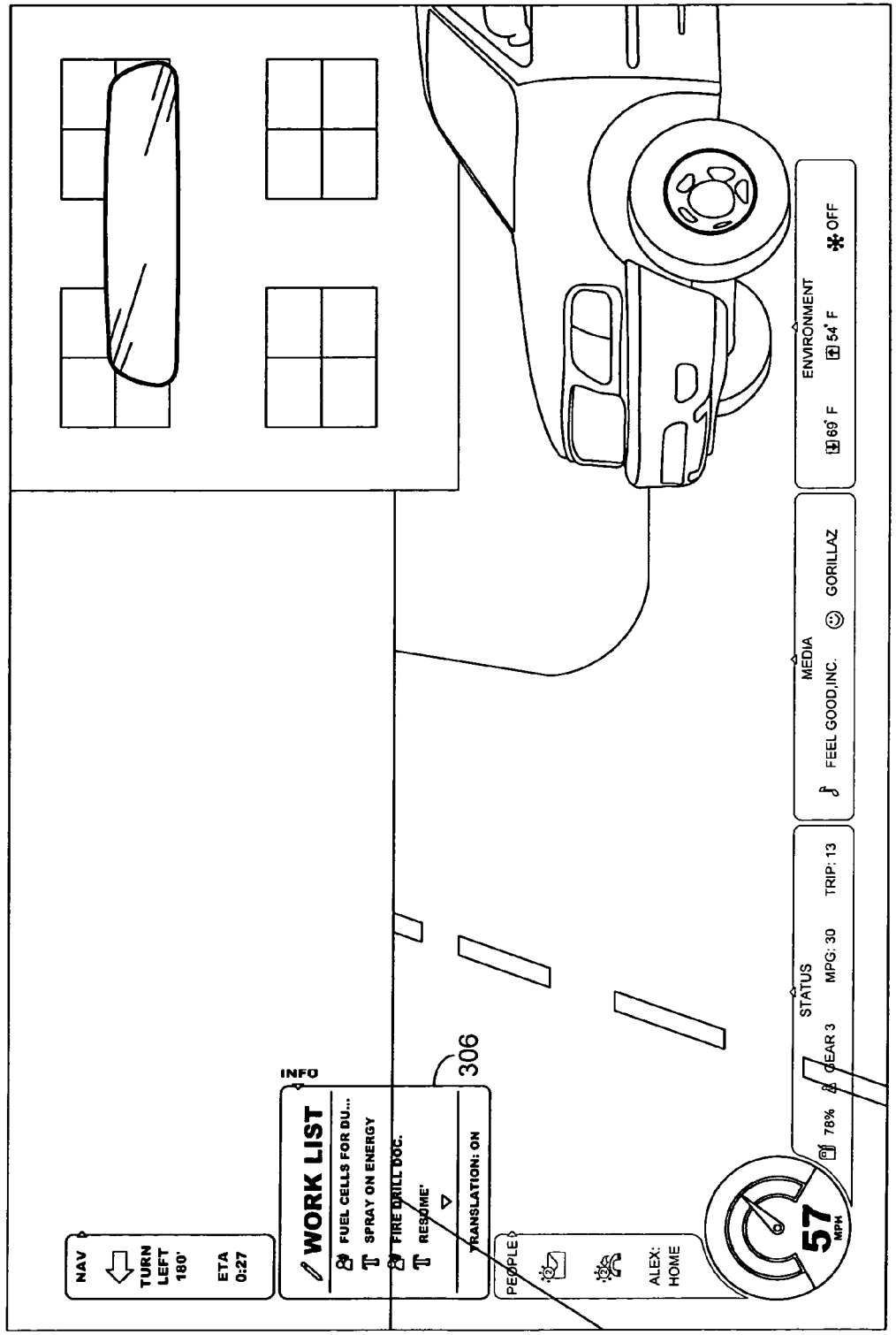

As a user is driving, the user may wish to select a particular display element, thereby causing the display element to be presented in the preview state. For example, as shown in FIG. 3K, the user has selected the information element 306 to access a work list of documents (e.g., documents stored in a docked mobile device). The user may select one of the documents and a text-to-speech capability may translate the document to audio played over the automobile's speaker system, allowing the user to listen to the document while driving.

Figure 3L:
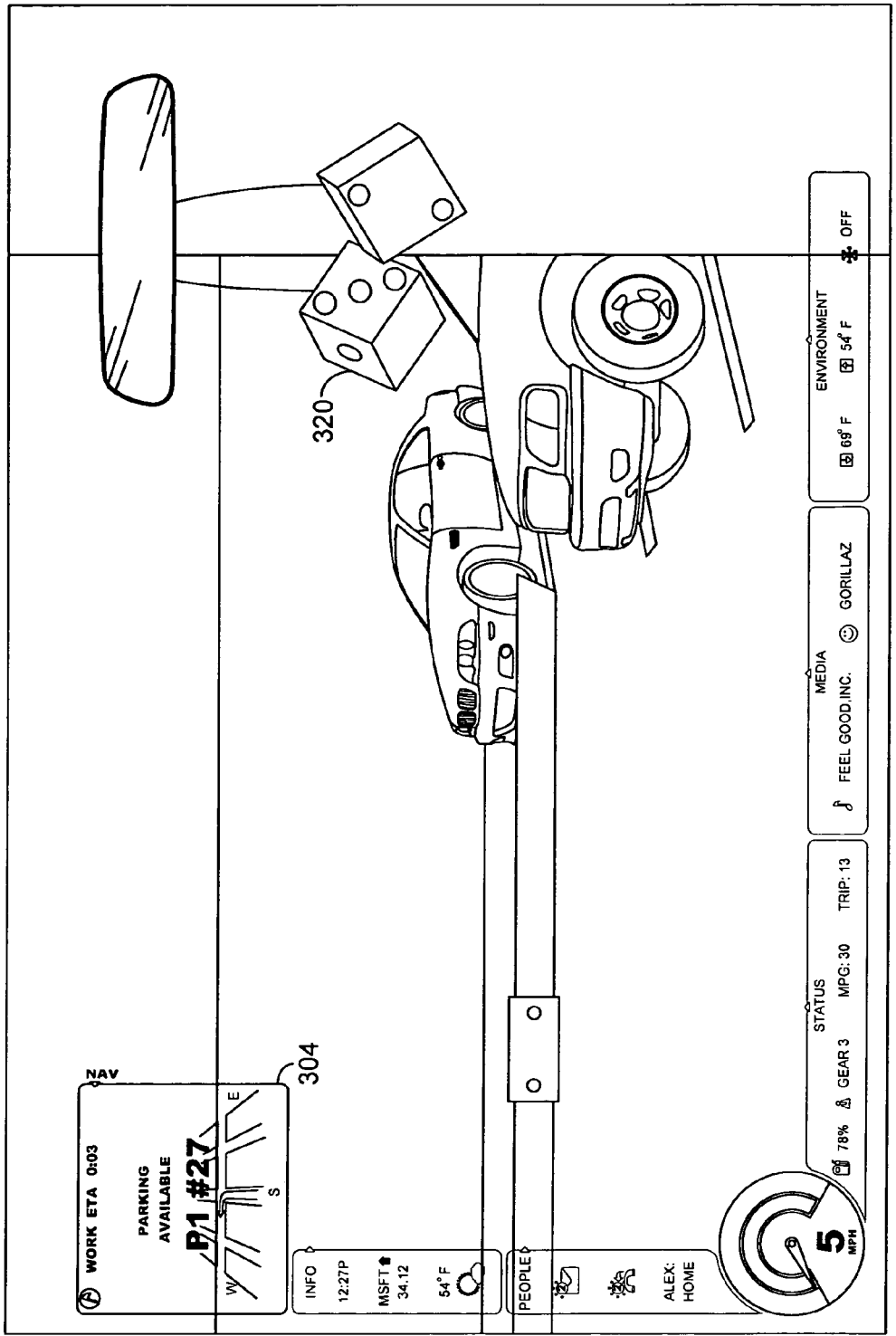

Inputs from remote networked sources and services may further provide context for the adaptive user interface. As an example, FIG. 3L provides an illustration of the adaptive user interface as the automobile approaches a parking garage. The system may receive inputs from a networked service associated with the parking garage. These inputs may include information such as a currently available parking space that is recommended, as well as directions to the parking space. Based on the inputs from the networked services associated with the parking garage, the adaptive user interface may display the information in the navigation element 304 shown in the preview state.

Figure 4:
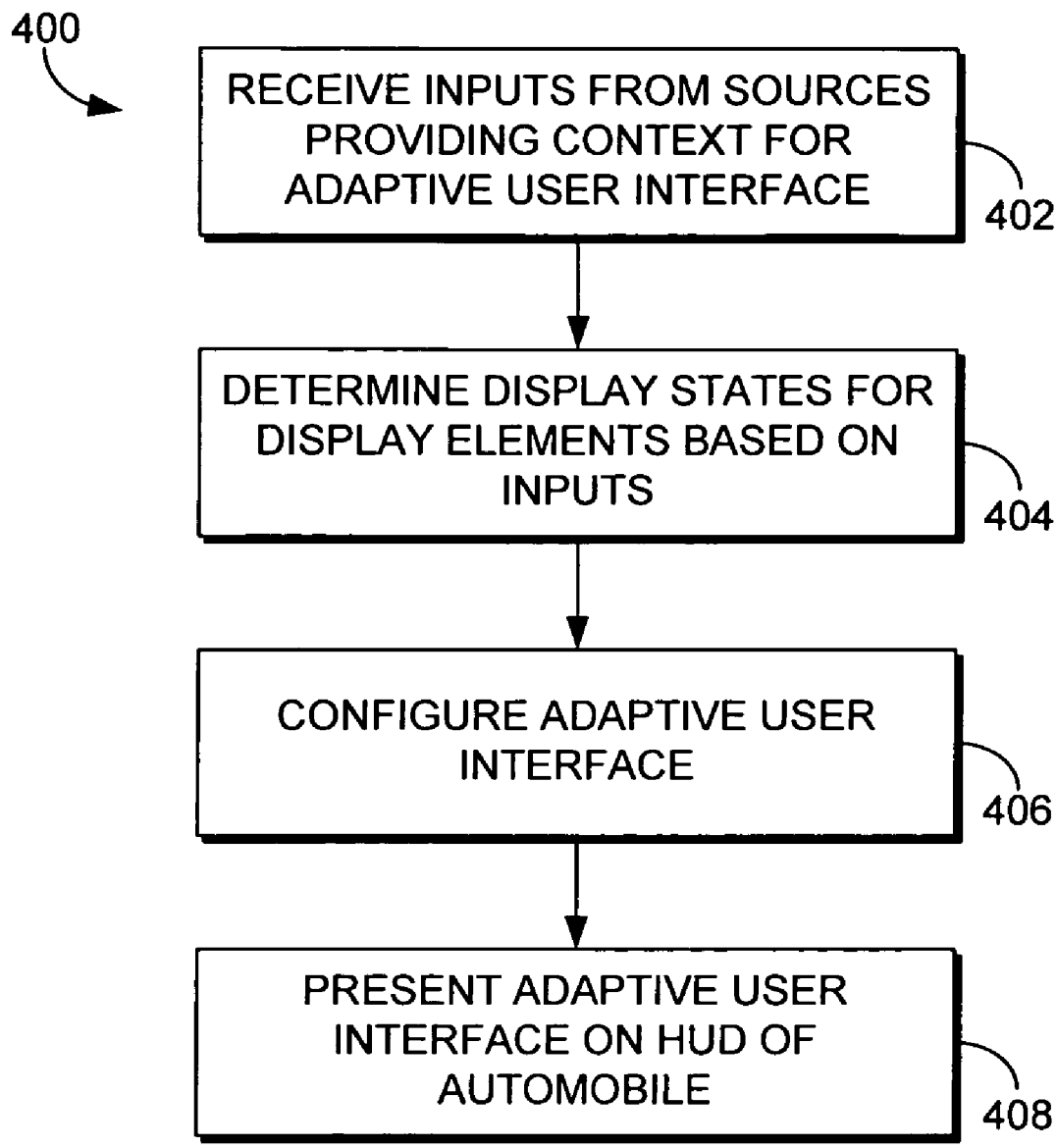
FIG. 4 is a flow diagram showing a method for presenting an adaptive user interface on the HUD of an automobile in accordance with an embodiment of the present invention.

Referring now to FIG. 4, a flow diagram is provided illustrating a method 400 for presenting an adaptive user interface on the HUD of an automobile in accordance with an embodiment of the present invention. Initially, inputs are received providing a context for the adaptive user interface, as shown at block 402. The inputs may be received from a variety of different sources, including the automobile, a user, a device, and remote networked sources and services. By way of example only and not limitation, inputs from the automobile may include current driving state, speed, and direction. User inputs may include, for example, user selection of a display element. Device inputs may include, for example, whether a device has been connected to the system. Inputs from networked sources and services may include relevant location-based information.

Based on the received inputs, display states for each display element of the adaptive user interface are determined, as shown at block 404. Additionally, available information is filtered to select the information that is appropriate for the determined display state for each display element. As discussed hereinabove, the adaptive user interface may comprise a number of different display elements, each associated with a particular type of information and capable of being displayed in a display state independent of the display state of the other display elements.

Rules may be defined within the system that dictate what inputs determine the display states for each element as well as the filtering of information for presentation via the adaptive user interface. In some embodiments, one or more of these rules may be based on personal preferences set by users. As such, users may configure the system based on preferences. In some embodiments, one or more of these rules may be based on safety requirements (e.g., requirements regarding the amount and/or type of information that may be displayed on the HUD based on various driving conditions).

By way of example only and not limitation, as indicated previously, in one embodiment, display states may include a hidden state, a collapsed state, a preview state, and full view state. The display state for each display element may be determined based on inputs, such as the automobile's current driving state, whether a user has selected a particular element, whether a device has been docked, and information received from network sources and services. For example, a collapsed state may be determined for non-selected elements while the automobile is parked. When a user selects one of the display elements while the automobile is still parked, a full view state may be determined for that element. When the automobile is being driven, a hidden state may be determined for particular elements while a collapsed state may be determined for other elements. Additionally, when a user selects a particular element while driving, a preview state may be determined for that element. As another example, whether a device has been connected to the system may dictate whether an element is displayed in a hidden state or otherwise. As a further example, automobile inputs indicating the automobile's current direction and inputs from a network source indicating an accident ahead may dictate that the information from the network source be presented in a preview state as the automobile approaches the accident. As is apparent from these examples, inputs from multiple sources may be used in conjunction to determine the appropriate display state and presented information for the display elements.

It should be noted that, as used herein, the term "display state" refers generally to how a display element is presented within the adaptive user interface. For example, a display state may simply consist of the location of a display element. For instance, referring to FIG. 3L, a virtual pair of fuzzy dice 320 are presented as a display element within the adaptive use interface. The presentation of the fuzzy dice 320 on the HUD may be configured such that it appears that the fuzzy dice 320 move with automobile movements (e.g., simulating movement of real fuzzy dice hanging from a rear view mirror). Accordingly, the display states for the fuzzy dice 320 may comprise a relative location on the HUD based upon automobile inputs (e.g., automobile movements, turns, etc.).

Referring back to FIG. 4, after determining the display states for each of the display elements and filtering the available information, the adaptive user interface is configured, as shown at block 406. The adaptive user interface is then presented on the HUD of the automobile, as shown at block 408. As represented by the return to block 402 from block 408, as the system receives further inputs, the adaptive user interface may determine new display states for each display element, reconfigure the user interface, and present the reconfigured user interface on the HUD of the automobile (i.e., repeating blocks 402 through 408).

As can be understood, embodiments of the present invention provide an adaptive user interface for presentation on the HUD of an automobile. Display elements of the adaptive user interface may be presented in varying display states based on inputs from different sources to provide information in context of the automobile's current situation, thereby providing users with a safe, yet productive driving experience. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media having computer-useable instructions embodied thereon for presenting one or more adaptive user interfaces on a heads-up display of an automobile, the one or more adaptive user interfaces comprising:
   a plurality of display elements, each of the plurality of display elements configured to be displayed in at least four display states, each of the at least four display states configured to present a different amount of information for each of the plurality of display elements, wherein the at least four display states comprises a hidden state, a collapsed state, a preview state and a full view state, wherein each of the plurality of display elements is displayed in one of the at least four display states based at least in part on one or more inputs indicative of a driving state of the automobile and based on a priority of each of the plurality of display elements to driving the automobile, wherein a low priority display element is presented in the hidden state while the automobile is being driven and a high priority display element is presented in the collapsed state while the automobile is being driven, and wherein at least one of the display elements is displayed in one of at least four display states independent of the other display elements.

2. The one or more computer-storage media of claim 1, wherein the plurality of display elements comprise at least one of a navigation element, an information element, a people element, a speedometer element, a status element, a media element, and an environment element.

3. The one or more computer-storage media of claim 2, wherein information for each of the plurality of display elements is accessed from one or more information sources.

4. The one or more computer-storage media of claim 3, wherein the one or more information sources include at least one of an audio system, a video system, a climate control system, a navigation system, an automobile status detection device, a mobile device, a remote networked source, a user input device, and a communication system.

5. The one or more computer-storage media of claim 1, wherein each of the plurality of display elements is displayed in one of the plurality of display states based further on inputs from at least one of a user input device, a mobile device, and a remote networked source.

6. The one or more computer-storage media of claim 1 wherein the computer-readable instructions embodied thereon further comprise one or more rules for determining one of the plurality of display states for each of the plurality of display elements based at least in part on the inputs associated with the automobile.

7. The one or more computer-storage media of claim 1, wherein the one or more rules comprise at least one of a user-defined rule and a rule based on one or more safety requirements.

8. A method for presenting an adaptive user interface on a heads-up display of an automobile, the adaptive user interface comprising a plurality of display elements, each of the plurality of display elements being configured to be presented in at least four display states, the method comprising:
   receiving one or more inputs from one or more sources providing a context for the adaptive user interface, wherein the one or more inputs are received from one or more automobile status detection devices to indicate a driving state of the automobile;
   determining a priority level of each of the plurality of display elements to driving the automobile;
   determining a display state for each of the plurality of display elements based on the one or more inputs and based on the priority level of each of the plurality of display elements to driving the automobile, wherein each of the at least four display states presents a different amount of information for each of the plurality of display elements based on the driving state of the automobile, wherein at least one of the display elements is displayed in one of the at least four display states independent of the other display elements;
   configuring the adaptive user interface to display each of the display elements in one of the at least four display states based on the driving state of the automobile and based on the priority level of each of the plurality of display elements to driving the automobile; and
   presenting the adaptive user interface on the heads-up display of the automobile.

9. The method of claim 8, wherein the plurality of display elements comprise at least one of a navigation element, an information element, a people element, a speedometer element, a status element, a media element, and an environment element.

10. The method of claim 8, wherein the plurality of display states comprise at least one of a hidden state, a collapsed state, a preview state, and a full view state.

11. The method of claim 8, wherein determining a display state for each of the plurality of display elements based on the one or more inputs comprises:
  accessing one or more rules for determining a display state for each of the plurality of display elements;
  comparing the one or more inputs against the one or more rules to determine a display state for each of the plurality of display elements.

12. The method of claim 11, wherein the one or more rules for determining a display state for each of the plurality of display elements comprise at least one of a user-defined rule and a rule based on one or more safety requirements.

13. One or more computer-storage media storing computer usable instructions for performing a method for presenting an adaptive user interface on a heads-up display of an automobile, the adaptive user interface comprising a plurality of display elements, each of the plurality of display elements being configured to be presented in a plurality of display states, the method comprising:
  determining the automobile is in a parked driving state;
  presenting a first display element in a collapsed display state, based on determining the automobile is in the parked driving state, wherein the first display element is condensed to its smallest form and provides a limited amount of information in the collapsed display state;
  receiving a first user selection of the first display element, while the automobile is in the parked driving state;
  based on the first user selection, presenting the first display element in a full view display state, wherein the full view display state includes more information than the collapsed display state;
  determining the automobile is in a traveling driving state;
  presenting the first display element in at least one of a hidden state and the collapsed display state, based on determining the automobile is in the traveling driving state and based on a priority of the first display element to driving the automobile, wherein a low priority display element is presented in the hidden state while the automobile is being driven and a high priority display element is presented in the collapsed state while the automobile is being driven, wherein the first display element is completely removed or dimmed in the hidden state;
  receiving a second user selection of the first display element, while the automobile is in the traveling driving state;
  based on the second user selection, presenting the first display element in at least one of the collapsed state and a preview display state, wherein the preview display state includes more information than the collapsed state but less information than the full view display state; and
  displaying a second display element in at least one of the collapsed display state, the hidden display state, preview display state and the full view display state, independent of the first display element.

14. The media of claim 13, wherein the method further comprises receiving one or more inputs from one or more automobile status devices, and wherein the automobile status devices provide automobile status information wherein the information may comprise the automobile's speed, fuel level, oil temperature, mileage and miles per gallon information.

15. The media of claim 14, wherein the automobile status devices allow for a number of user inputs to be provided to the automobile status devices, wherein the user inputs are provided via devices associated with steering, brakes, gas, and turn signals.

* * * * *